L. R. APPLEGATE.
ROTARY CUTTER.
APPLICATION FILED OCT. 28, 1913.
1,099,900.
Patented June 9, 1914.
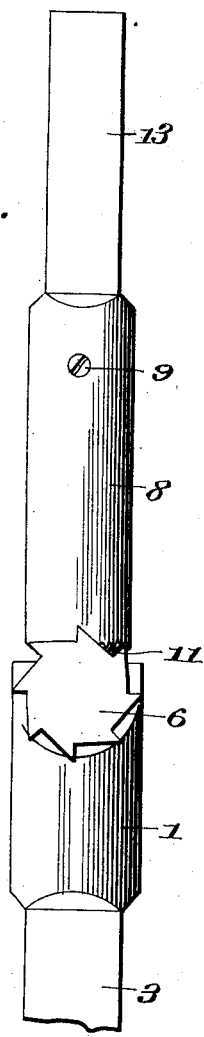
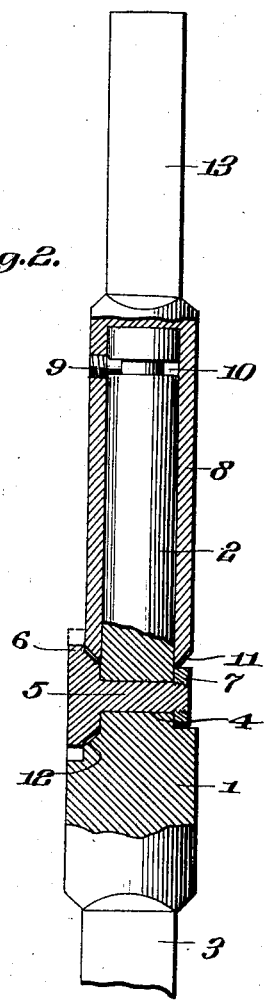
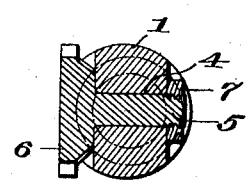
Inventor
L. R. Applegate,
By Victor J. Evans
Attorney
Witnesses

UNITED STATES PATENT OFFICE.

LEE ROY APPLEGATE, OF SPOKANE, WASHINGTON, ASSIGNOR TO UTILITY MANUFACTURING COMPANY, OF SEATTLE, WASHINGTON, A CORPORATION OF WASHINGTON.

ROTARY CUTTER.

1,099,900.     Specification of Letters Patent.     Patented June 9, 1914.

Application filed October 28, 1913. Serial No. 797,820.

*To all whom it may concern:*

Be it known that I, LEE ROY APPLEGATE, a citizen of the United States, residing at Spokane, in the county of Spokane and State of Washington, have invented new and useful Improvements in Rotary Cutters, of which the following is a specification.

This invention relates to improvements in rotary cutters and has particular application to a cutter for cutting square holes.

In carrying out the present invention, it is my purpose to provide a cutting tool whereby the walls of circular holes may be cut so as to give such holes a square outline in cross section.

It is also my purpose to provide a tool of the class described which will embody among other features a shank, a rotary cutter mounted upon the shank between the ends thereof and adapted to rotate about an axis at right angles to the plane of the shank, and a sleeve surrounding one end of the shank and capable of rotating thereabout and having connections with the cutter so that in the rotation of the sleeve motion will be imparted to the cutter whereby the walls of the hole in which the tool is installed may be squared.

Furthermore, I aim to provide a cutting tool of the type set forth which will embrace the desired features of simplicity, efficiency and durability and one wherein the parts will be so arranged and correlated as to reduce the possibility of derangement or mutilation to a minimum.

With the above and other objects in view, the invention consists in the construction, combination and arrangement of parts hereinafter set forth in and falling within the scope of the claims.

In the accompanying drawing, Figure 1 is a view in elevation of a cutting tool constructed in accordance with my present invention. Fig. 2 is a vertical central sectional view through the same. Fig. 3 is a cross sectional view therethrough. Fig. 4 is a detail view of the cutter removed.

Referring now to the accompanying drawing in detail, the numeral 1 designates a shank, such shank, in the present instance, having the upper and lower portions thereof reduced circumferentially as at 2, 3 and the portion 3 square in cross section. Formed in the upper portion 2 of the shank adjacent to the juncture of such portion with the center portion thereof is a transverse opening 4 in which is journaled for rotary movement a shaft 5 having fixed to one end thereof a rotary cutter 6, while the opposite end is screw threaded to receive a securing nut 7. Surrounding the upper portion 2 of the shank and capable of rotation thereabout is a sleeve 8 carrying a pin 9 disposed within an annular groove 10 formed in the upper portion of the shank, the pin and groove serving to prevent accidental disconnection of the sleeve from the shank. The sleeve 8 is geared up to the cutter 6 so that in the rotation of the sleeve a similar motion will be imparted to the cutter and, in the present instance, the lower end of the sleeve is formed to provide a bevel gear 11 meshing with a similar gear 12 formed on the inner face of the cutter 6, the shaft 5, cutter 6 and the gear 12 being all cast in one piece in this form of my invention. The upper end of the sleeve 9 is equipped with a tang 13 designed to fit into the socket of a brace, lathe or other analogous machine.

In practice, the tang 13 is appropriately fastened within the socket of the lathe or brace and the end portion 3 of the shank 1 passed through the circular hole in the piece of material to be cut and into a socket in the table of the brace or lathe whereby the cutting tool as a whole will be held in proper line. The sleeve 8 is now rotated and through the medium of the gears 11 and 12 imparts movement to the cutter 6 and the latter acts upon the walls of the hole in such manner as to cut one side wall of a square hole. After the first side wall has been cut the cutter is rendered inactive and moved back to its initial position and the tool as a unit is turned through an angle of approximately ninety degrees whereby the cutter will act upon the remaining portion of the side wall of the circular hole to form the second wall of the square hole, this manipulation of the tool being continued until all four side walls of the square hole have been formed.

While I have herein shown and described one preferred form of my invention by way of illustration, I wish it to be understood that I do not limit or confine myself to the precise details of construction herein described and delineated, as modification and variation may be made within the scope of the claims without departing from the spirit of the invention.

I claim:

1. A tool of the class described comprising a shank having a transverse opening therein, a shaft journaled in said opening, a rotary cutter upon one end of said shaft, a sleeve surrounding one end of said shank and adapted to rotate thereon, and driving connections between said sleeve and cutter.

2. A tool of the class described comprising a shank having a transverse opening therein, a shaft journaled in said opening, a cutter upon one end of said shaft, a sleeve surrounding one end of said shaft and adapted to rotate thereon, a bevel gear upon one end of said sleeve, and a bevel gear upon said cutter and meshing with the first-mentioned bevel gear.

3. A tool of the class described comprising a shank having a transverse opening therein, a shaft journaled in said opening, a cutter upon one end of said shaft, a sleeve surrounding one end of said shaft and adapted to rotate thereon, a bevel gear upon one end of said sleeve, a bevel gear upon said cutter and meshing with the first-mentioned bevel gear, and means for preventing accidental disconnection of said sleeve and shank.

4. A tool of the class described comprising a shank having a transverse opening therein, a shaft journaled in said opening, a cutter upon one end of said shaft, a sleeve surrounding one end of said shaft and adapted to rotate thereon, a bevel gear upon one end of said sleeve, a bevel gear upon said cutter and meshing with the first-mentioned bevel gear, and a pin and groove connection between said sleeve and shank whereby accidental disconnection of the same is avoided.

5. A tool of the class described comprising a shank, a cutter carried by said shank and rotatable about an axis at right angles to the plane of the shank, a sleeve surrounding said shank and adapted for rotary movement, and driving connections between said sleeve and cutter.

In testimony whereof I affix my signature in presence of two witnesses.

LEE ROY APPLEGATE.

Witnesses:
W. S. EASTON,
T. F. HAVENS.

---

Copies of this patent may be obtained for five cents each, by addressing the "Commissioner of Patents, Washington, D. C."